United States Patent [19]

Uffner

[11] 4,333,866
[45] Jun. 8, 1982

[54] ASPHALT COMPOSITION

[75] Inventor: William E. Uffner, Newark, Ohio

[73] Assignee: Owens-Corning Fiberglas Corporation, Toledo, Ohio

[21] Appl. No.: 159,526

[22] Filed: Jun. 16, 1980

[51] Int. Cl.$^3$ ............................................. C08L 91/00
[52] U.S. Cl. .................................... 524/534; 260/718; 260/733; 260/745; 260/758; 427/389.8; 428/440; 428/489; 525/54.5
[58] Field of Search ................ 260/28.5 AS, 718, 733, 260/745, 758; 427/389.8; 428/440, 489

[56] References Cited

U.S. PATENT DOCUMENTS 4,154,710  5/1979  Maldonado et al. .......... 260/23 XA
4,273,685  6/1981  Marzocchi et al. ................ 260/4 R

FOREIGN PATENT DOCUMENTS 2015002  9/1979  United Kingdom ........ 260/28.5 AS

Primary Examiner—Melvyn I. Marquis
Attorney, Agent, or Firm—Ronald C. Hudgens; Robert F. Rywalski; Keith V. Rockey

[57] ABSTRACT

A rubber-modified asphalt composition prepared by reacting asphalt with a rubbery polymer, a polymerizable vinyl aromatic monomer and a polymerizable vinyl aromatic monomer in which the vinyl group is substituted whereby the chemical integration of the rubbery polymer with the asphalt is accelerated by the use of a combination of the polymerizable vinyl aromatic monomer and the substituted vinyl aromatic monomer.

15 Claims, No Drawings

ASPHALT COMPOSITION

TECHNICAL FIELD

This invention relates to rubber-modified asphalt compositions, and more specifically to asphalt compositions which have been chemically modified to promote compatibility between the asphalt and reinforcements employed with the asphalt.

BACKGROUND OF THE INVENTION

In application Ser. No. 881,108, filed Feb. 24, 1978, now abandoned, and Ser. No. 45,047, filed June 4, 1979, now U.S. Pat. No. 4,273,685, there is disclosed as asphalt composition which has been chemically modified with the rubbery polymer to increase fire retardancy and chemical reactivity of the asphalt. The modification of the asphalt with a rubbery polymer also has been found to promote compatability between the asphalt and reinforcements used with the asphalt, notably glass fibers, glass flake and other organic and inorganic fillers and reinforcements.

The chemically-modified asphalts disclosed in the foregoing copending applications are prepared by reaction of a bitumen, and preferably asphalt, with a vinyl aromatic monomer such as styrene and a rubbery polymer. It has been postulated that the vinyl aromatic monomer employed as a coreactant is polymerizable with ethylenic unsaturation contained in the bitumen and thus serves to couple, by means of chemical bonds, the asphalt molecules with the rubber polymer. The resulting chemically-modified asphalt can thus be cross linked with the use of a suitable cross-linking agent well known to those skilled in the art. In addition, the rubbery polymer which has been chemically bonded to the asphalt can serve as a source of reaction sites to establish a chemical bond between the chemically-modified asphalt and reinforcing fillers such as glass fibers, siliceous aggregate, glass flake and combinations thereof which may be blended with the chemically-modified asphalt in reinforced asphalt systems.

SUMMARY OF THE INVENTION

In the preparation of chemically-modified asphalt compositions as is described in the foregoing applications, it was found that the reaction could be caused to take place by simply contacting the rubbery polymer with the vinyl aromatic monomer, and heating the resulting mixture. It was found that, while a catalyst could be used to promote the reaction, the reaction would also proceed in the absence of the catalyst.

The resulting rubber-modified asphalt was found to be substantially free from tackiness and could be used in the treatment of glass fibers for a variety of applications, including road-paving applications, roof repair applications and the like.

One of the difficulties surrounding the preparation of rubber-modified compositions as is described in the foregoing applications stems from the fact that the reaction should be allowed to proceed for several hours, frequently for as many as 24 hours in order to produce a rubber-modified asphalt which is tack-free.

It is accordingly an object of this invention to provide a chemically-modified asphalt system which overcomes the disadvantages described above.

It is a more specific object of this invention to provide a chemically-modified asphalt wherein the asphalt molecules are chemically combined with elastomeric materials in a reaction in which the chemical integration between the elastomeric material and the asphalt can take place more quickly.

The concepts of this invention reside in a chemically-modified asphalt composition produced by the reaction of asphalt with a rubbery polyer, a polymerizable vinyl aromatic monomer, and a polymerizable vinyl aromatic monomer in which the vinyl group is substituted. Without limiting the present invention as to theory, it is believed that the vinyl aromatic monomer, which is polymerizable with the ethylenic unsaturated of the asphalt to couple the rubbery polymer to the asphalt, generally integrates the rubbery polymer with the asphalt. The reaction during which that occurs is accelerated by the use of a combination of a vinyl aromatic monomer with a vinyl aromatic monomer containing a substituent in the vinyl group.

The resulting chemically-modified asphalt has all of the desirable characteristics of the asphalt described above and yet can be formed during reactions requiring less reaction time.

The chemically-modified asphalt produced in accordance with the concepts of this invention can be cross linked through the use of suitable cross-linking agents. The rubbery polymer chemically bonded to the asphalt can also serve as a source of reaction sites to establish a secure chemical bond between the chemically-modified asphalt and reinforcing fillers such as glass fibers, glass flake, siliceous aggregate and combinations thereof which are blended with the chemically-modified asphalt in reinforced systems.

DESCRIPTION OF THE PREFERRED EMBODIMENT

In the practice of this invention, use is made of at least a vinyl aromatic monomer which is substituted on the vinyl group. Preferred compounds are those having the general formula:

$$R_1-C(R_2)=C(R_2)-R_3$$

wherein $R_1$ is an aromatic group such as a phenyl group, a substituted phenyl group wherein the substituent is any one or more of an amino group, a cyano group, a halogen group, a $C_1$ to $C_3$ alkoxy group, a $C_1$ to $C_3$ alkyl group, a hydroxy group, a nitro group, etc., $R_2$ is hydrogen or methyl, and $R_3$ is selected from the group consisting of $-CH_2OH$, $-CHO$, $-COX$ wherein X is halogen, $-COOH$ and $-CH_2CN$.

In addition, $R_1$ can also be a heterocyclic group such as a pyridine group or a quinoline group or the like. In general, $R_1$ is an aromatic group containing 6 to 12 carbon atoms.

Illustrative of suitable substituted vinyl aromatic monomers are cinnamic acid, cinnamic alcohol, cinnamoyl chloride, beta-phenylmethacrylic acid, etc.

The substituted vinyl aromatic monomers can be used as the sole monomeric material present in the reaction mass, or they can be used in addition to vinyl aromatic monomers which are unsubstituted. When the latter are present, they have the general formula:

$$R_4-CH=CH_2$$

wherein $R_4$ has the same meaning of $R_1$ described above.

Illustrative of such monomers are styrene, p-aminostyrene, o-methoxystyrene, 2-vinyl pyridine, 3-vinyl quinoline, etc.

As the rubbery polymer, use can be made of a number of elastomeric materials well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, and like substituted homopolymers of conjugated dienes may likewise be used in the practice of this invention. Such substituted butadienes are commercially available from, for example, Atlanta-Richfield under the trademark "Poly B-D," a series of hydroxy-terminated butadiene polymers; for example, use can be made of hydroxy-terminated butadiene homopolymers (e.g., Poly B-D R-15M which has a hydroxy number of 42 or Poly B-D R-45M).

In addition, use can preferably be made, as the rubbery polymers, of elastomeric materials formed by copolymerization of one or more of the conjugated dienes described above with one or more ethylenic monomers such as styrene as well as lower alkyl hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers (e.g., Poly B-D CN-15 having a hydroxyl number of 39). Most preferred for use in the practice of this invention is the butadiene-styrene rubber marketed by Phillips Petroleum under the trademark "Solprene" 1205C.

In carrying out the reaction of the asphalt with the vinyl aromatic monomers and the rubbery polymer, it has been found that no catalysts are required, although free radical catalysts may be used, if desired. It is sufficient that the mixture of the asphalt, the monomer or monomers and the rubbery polymer be heated to a temperature ranging from 300°–500° F., and preferably 330° to 370° F., to promote the reaction. As will be appreciated by those skilled in the art, the reaction time is somewhat dependent on the reaction temperature with higher temperatures favoring a more rapid rate of reaction. If desired, the asphalt can be, prior to reaction with the vinyl aromatic monomers and the rubbery polymer, dissolved in an inert organic solvent, preferably, an aromatic solvent, although the use of the solvent is not necessary. It is generally preferred to carry out the reaction under non-oxidizing conditions to avoid combustion. Use of a vacuum or an inert gas can be made for that purpose.

The relative proportions of the monomer and the rubbery polymers are not critical to the practice of this invention and can be varied within relatively wide ranges. In general, use is made of a monomer content corresponding to 0.5 to 40% by weight based on the weight of the asphalt, and a rubbery polymer in an amount ranging from 0.5 to 35% by weight based upon the weight of the asphalt. When an unsubstituted monomer is employed in combination with the substituted monomer, the substituted monomer may be employed in an amount ranging from 1–75% by weight of the unsubstituted monomer, although such proporations are not critical and subject to considerable variation, depending somewhat on the properties desired in the final product.

In carrying out the reaction used to produce rubber-modified asphalts of this invention, use can be made of ordinary asphalt or asphalt which has been modified by reaction with air (e.g., blown asphalt) or steam as described in copending application Ser. No. 852,898, filed Nov. 18, 1977.

It has been found that the interreaction of a vinyl aromatic monomer and the rubbery polymer with the asphalt produces a highly cross linked asphalt which is non-tacky at ordinary temperatures. The resulting asphalt, having improved compressive strength, can thus be used in a variety of applications. For example, the asphalt compositions of this invention are highly suitable for use in road-paving applications, and particularly road-paving applications wherein the asphalt is reinforced with glass, either in the form of glass fibers or in the form of glass flake or other reinforcing materials. It is believed that the reaction of the vinyl aromatic compound and the rubbery polymer serves to impart to the asphalt reactive groups which are capable of establishing a chemical bond between the asphalt and glass used as reinforcement.

In addition, asphalt compositions of this invention can also be used in applications where asphalt is reinforced with siliceous fillers other than glass or in addition to glass, notably including siliceous aggregates.

In one form of the invention, the asphalt compositions of this invention can be used in the treatment of glass fibers to improve the bonding relationship between the glass fibers and a wide variety of materials reinforced with glass. For example, the asphalt compositions of the invention can be applied as a thin coating to individual glass fiber filaments, or as an impregnant to bundles of glass fibers whereby the asphalt coating or impregnant serves to intertie the glass fiber surfaces with, for example, treated or untreated asphalt used in road-paving applications. In this embodiment of the invention, the coated or impregnated glass fibers can advantageously be used as reinforcement for unmodified asphalt in road-paving applications whereby the asphalt matrix of the road-paving material is chemically bonded to the coating or the impregnant to the glass fibers. The asphalt forming the coating or impregnant, in turn, serves to intertie the chemically-modified asphalt of this invention with the untreated asphalt, the latter forming a continuous phase in which the coated or impregnated glass fibers are distributed as reinforcement.

The chemically-modified asphalt can be employed alone in road-paving or road repair applications, or can be blended with glass fibers or flake to provide reinforcement for the asphalt. The chemically-modified asphalt is particularly well suited for use in the repair of asphalt pavement because the asphalt of the invention, as a result of chemical modification, has many outstanding properties, such as non-tracking and non-bleeding properties and good cold-temperature flex.

In addition, the asphalt-treated glass fibers of this invention can also be used as reinforcement for other materials, including, but not limited to, rubber in the manufacture of glass fiber-reinforced elastomeric products, such as tires, and plastics, as in the manufacture of glass fiber-reinforced plastics.

The chemically-modified asphalt of this invention is well suited for use in the repair of "potholes" and cracks in pavements as well as a joint sealer. In "pothole" repairs, it is desirable to dispense the chemically-modified asphalt of the invention about the hole to be repaired to form in the nature of a circumscribing wall about the hole. The hole is then preferably partially filled with the chemically-modified asphalt of the invention, and then substantially completely filled with either a conventional cold mix or ground recycled asphalt. The area under repair is then overcoated with the asphalt of the invention or, if desired, glass fiber reinforcement is positioned over the repair area and then the overcoating applied. The glass fiber-reinforcement can be in the form of mats formed of glass fibers such as chopped strand mats, continuous strand mats, swirl mats, woven and non-woven fabrics, woven rovings, scrim and the like.

When used in the coating or impregnation of glass fibers or bundles of glass fibers, respectively, use can be made of asphalt compositions of this invention in amounts over relatively wide ranges. Generally, the coating or impregnant is applied in an amount sufficient to constitute from 0.1 to about 50% by weight, or even higher, of the weight of the glass fibers.

It has been found, in accordance with the practice of this invention that, when applying asphalt compositions of this invention to glass fibers, either as a thin film coating on the individual glass fiber filaments or as an impregnant, it may be desirable to heat the asphalt after it has been applied to the glass fiber surfaces. That optional heat treatment step serves to set the asphalt coating on the glass fiber surfaces, and at the same time, to insolubilize by further cross linking the asphalt thereon. The heating step has been found to increase the wet strength of the asphalt-treated glass fibers significantly.

In carrying out the optional heating step as described above, it is sufficient that the asphalt-treated glass fibers be heated to a temperature ranging from 200°–500° F., depending somewhat on the softening point of the asphalt involved.

Having described the basic concepts of the present invention, reference is now made to the following examples, which are provided by way of illustration and not by way of limitation, of the practice of this invention in the preparation of chemically-modified asphalts and their use.

EXAMPLE 1

This example illustrates the practice of this invention in the use of cinnamic alcohol in the preparation of a rubber-modified asphalt.

A reaction mixture is formulated as follows:

|  | Parts by weight |
| --- | --- |
| Asphalt (AC-20) | 750 |
| Cinnamic alcohol | 85 |
| Butadiene-styrene rubber | 125 |

The reaction mixture is heated to a temperature of about 350° F.; after about 12 hours of reaction time, the product of the reaction is a rubber-modified asphalt which is substantially free of tack.

EXAMPLE 2

This example illustrates the use of a substituted vinyl aromatic monomer in combination with an unsubstituted vinyl aromatic monomer in the preparation of a rubber-modified asphalt. Using the procedure described in Example 1, a reaction mixture is formulated as follows:

|  | Parts by weight |
| --- | --- |
| Asphalt | 750 |
| Butadiene-styrene rubber | 120 |
| Styrene | 40 |
| Cinnamic acid | 50 |

After 15 hours of reaction time, the rubber-modified asphalt produced in the reaction is substantially free of tack.

It will be understood that various changes and modifications can be made in the details of procedure, formulation and use without departing from the spirit of the invention, especially as defined in the following claims.

I claim:

1. A chemically-modified asphalt composition comprising an asphalt which has been reacted with (1) a polymerizable vinyl aromatic monomer which has the formula:

$$R_1-C(R_2)=C(R_2)-R_3$$

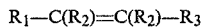

wherein $R_1$ is an aromatic group containing 6 to 12 carbon atoms, $R_2$ is hydrogen or methyl and $R_3$ is selected from the group consisting of —CH$_2$OH, —CHO, —COX wherein X is halogen, —COOH and —CH$_2$CN and (2) a rubbery polymer.

2. In a method for the preparation of a chemically-modified asphalt wherein an asphalt is reacted with a rubber polymer and a vinyl aromatic monomer, the improvement comprising decreasing the reaction time by using as at least part of said vinyl aromatic monomer or monomer which has the formula:

$$R_1-C(R_2)=C(R_2)-R_3$$

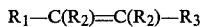

wherein $R_1$, $R_2$ and $R_3$ are as defined in claim 1.

3. A chemically-modified asphalt composition as defined in claim 1 wherein the reaction also includes an unsubstituted polymerizable vinyl aromatic monomer having the general formula:

$$R_4-CH=CH_2$$

wherein $R_4$ is an aromatic group containing 6 to 12 carbon atoms.

4. A chemically-modified asphalt composition as defined in claim 1 wherein the rubber polymer is selected from the group consisting of homopolymers of a conjugated diene and copolymers formed of a conjugated diene and at least one ethylenic monomer copolymerizable therewith.

5. A chemically-modified asphalt composition as defined in claim 4 wherein the ethylenic monomer is selected from the group consisting of styrene, acrylonitrile, methacrylonitrile, acrylic acid, methacrylic acid, hydroxystyrene, aminostyrene and mercaptostyrene.

6. A chemically-modified asphalt composition as defined in claim 1 wherein the asphalt to be reacted is an asphalt which has been pre-reacted with a modifying agent selected from the group consisting of steam, an oxygen-containing gas, ammonia and organic amines.

7. A chemically-modified asphalt composition as defined in claim 3 wherein the unsubstituted vinyl aromatic monomer is styrene.

8. A chemically-modified asphalt composition as defined in claim 1 wherein the vinyl aromatic monomer is cinnamic alcohol.

9. A chemically-modified asphalt composition as defined in claim 1 wherein the total of the vinyl aromatic monomers used in the reaction is an amount within the range of 0.5 to 40% by weight based on the weight of the asphalt.

10. A chemically-modified asphalt composition as defined in claim 1 wherein the rubbery polymer is reacted in an amount ranging from 0.5 to 35% by weight based on the weight of the asphalt.

11. Glass fibers having a coating thereon, said coating comprising a chemically-modified asphalt as defined in claim 1.

12. Glass fibers as defined in claim 11 wherein the glass fibers are in the form of a bundle and the coating constitutes an impregnant in the bundle.

13. In a glass fiber reinforced asphalt wherein an asphalt constitutes a continuous phase in which the glass fibers are distributed as reinforcement, the improvement comprising, as the continuous phase, a chemically-modified asphalt as defined in claim 1.

14. In a glass fiber reinforced asphalt wherein an asphalt constitutes a continuous phase in which glass fibers, having a coating thereon, are distributed through the continuous phase as reinforcement, the improvement comprising glass fibers which have been coated with a chemically-modified asphalt as defined in claim 1.

15. The improvement of claim 1 wherein said vinyl aromatic monomer includes said monomer of the formula:

$$R_1-C(R_2)=C(R_2)-R_3$$

and a monomer of the formula $$R_4-CH=CH_2$$

wherein $R_4$ is an aromatic group containing 6 to 12 carbon atoms.

* * * * *

UNITED STATES PATENT AND TRADEMARK OFFICE
CERTIFICATE OF CORRECTION

PATENT NO. : 4,333,866
DATED : June 8, 1982
INVENTOR(S) : William E. Uffner

It is certified that error appears in the above—identified patent and that said Letters Patent is hereby corrected as shown below:

At column 2, line 11, the word "unsaturated" should be "unsaturation".

At column 6, line 36, the word "or" should be "a".

Signed and Sealed this

Twenty-eighth Day of December 1982

[SEAL]

Attest:

GERALD J. MOSSINGHOFF

Attesting Officer   Commissioner of Patents and Trademarks